June 16, 1931.　　　　J. E. KENNEDY　　　　1,809,902
SYSTEM OF AND MEANS FOR PREPARING FUEL AND
DELIVERY THEREOF TO A PLACE OF COMBUSTION
Filed Jan. 30, 1926　　　4 Sheets-Sheet 4
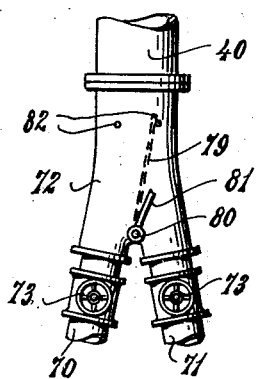
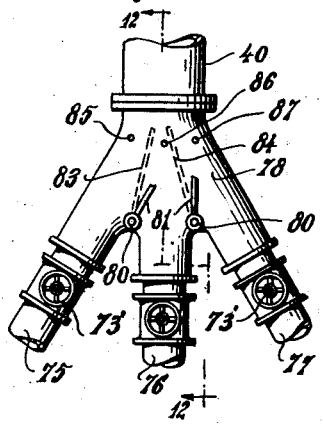
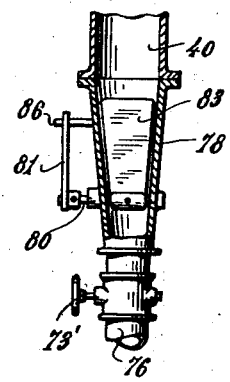
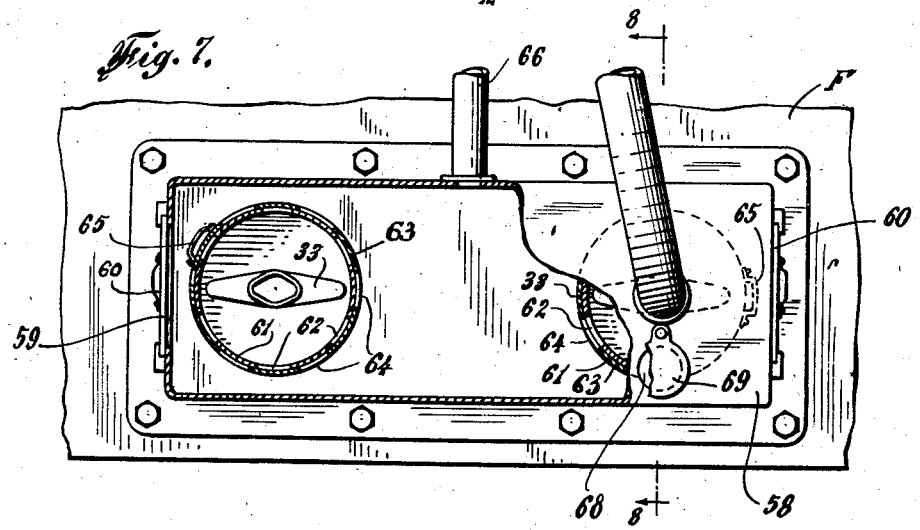
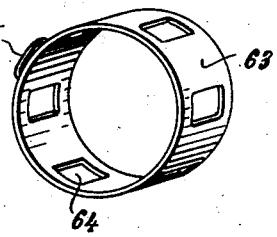
INVENTOR
J. E. Kennedy
BY
ATTORNEY Patented June 16, 1931

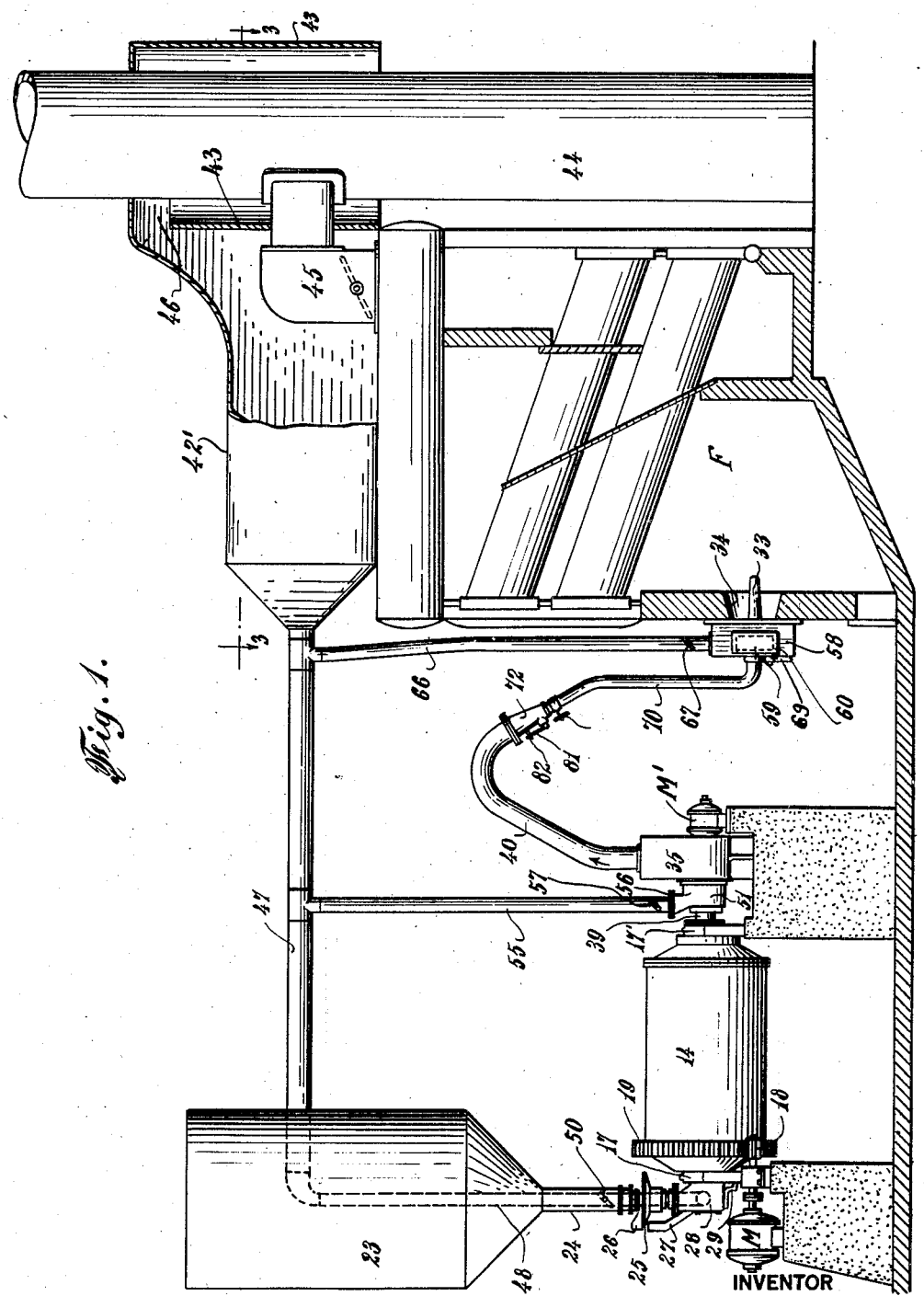

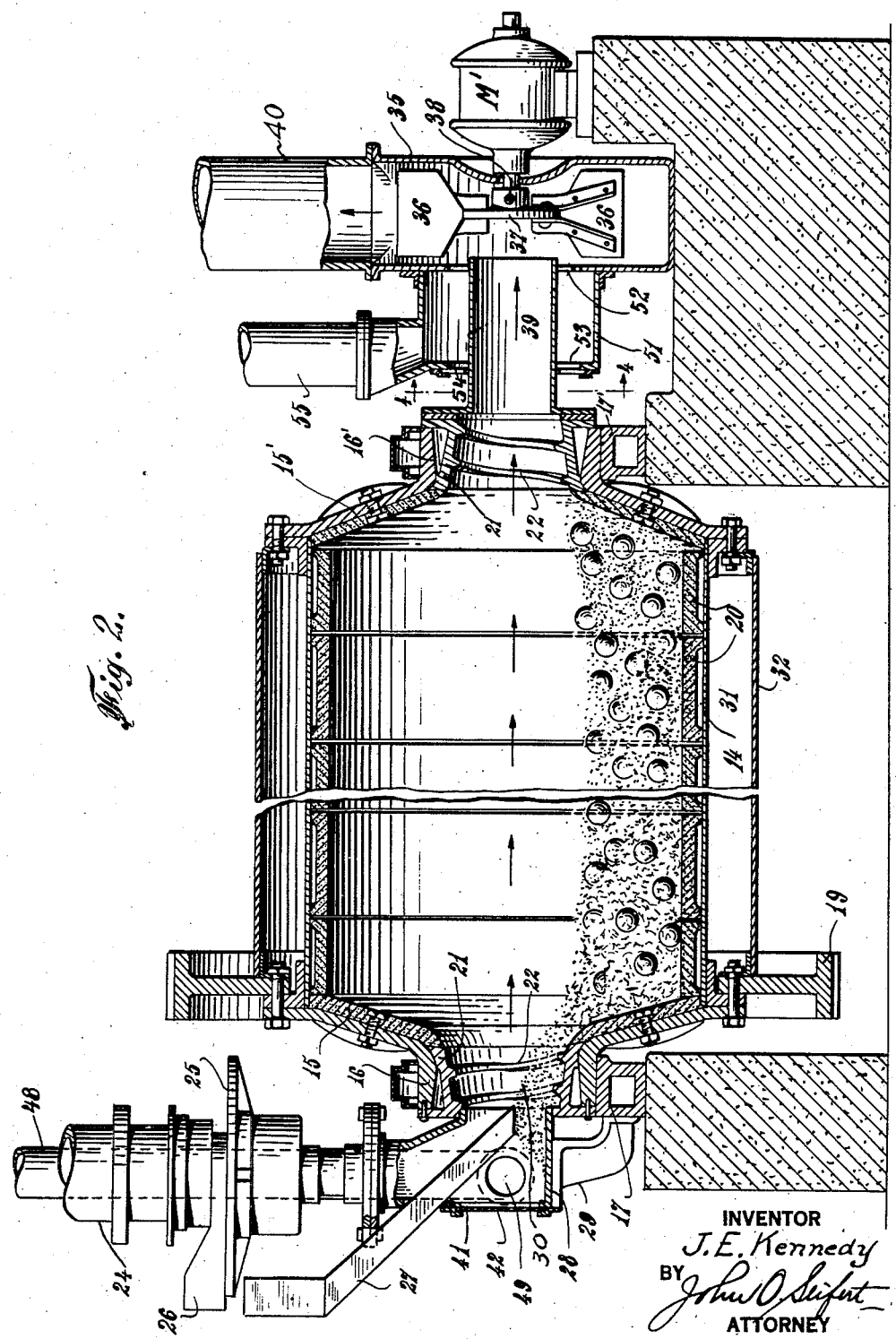

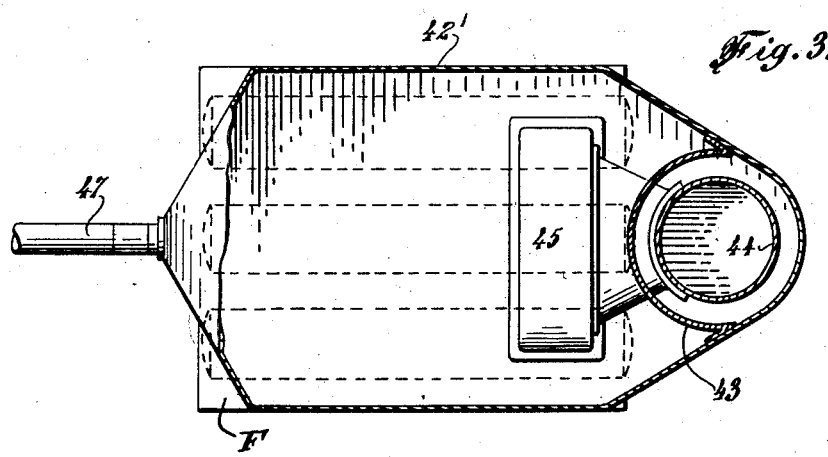
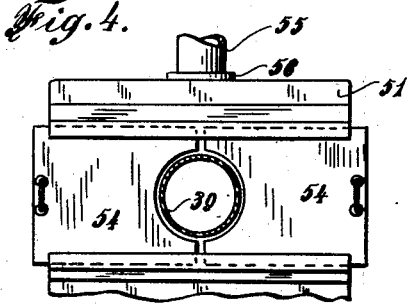
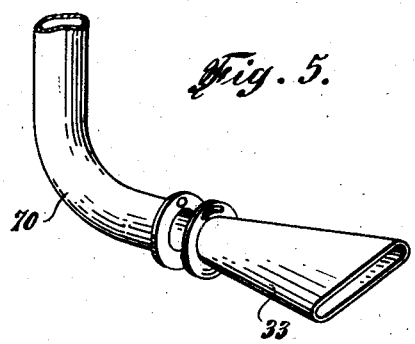
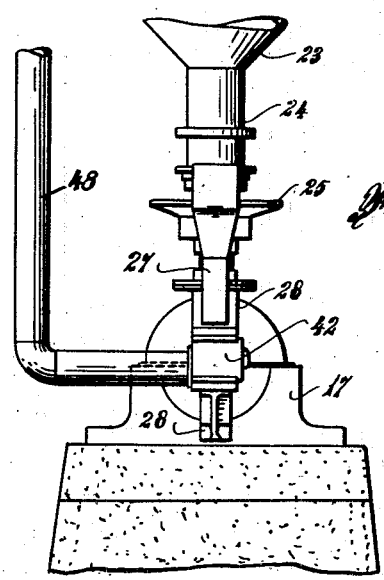

1,809,902

UNITED STATES PATENT OFFICE

JOSEPH E. KENNEDY, OF NEW YORK, N. Y.

SYSTEM OF AND MEANS FOR PREPARING FUEL AND DELIVERY THEREOF TO A PLACE OF COMBUSTION

Application filed January 30, 1926. Serial No. 84,928.

This invention relates to a system of pulverizing combustible material and means for feeding or delivering the same as a fuel to a place of combustion, and it is the object of the invention to provide an improved system and process of and means for rendering a combustible material pulverulent, admixing the same with a fluid to form a combustible mixture or fuel, and the delivery or feeding of the fuel to a place of combustion, such as a burner or burners in the combustion chamber of a furnace.

It is a further object of the invention to provide in a fuel preparing and delivery system of this character, including means to reduce a combustible material to a pulverulent condition and pneumatic means to draw off the pulverulent material from the pulverizing means and the delivery of said material to a burner for consumption in a fuel burning furnace, means to supply air in predetermined variable volume for admixture with the material as it is being pulverized, and to supply air in predetermined variable volume to the pulverulent material laden air drawn from the pulverizing means to form a fuel mixture having a uniform density of the pulverulent material for delivery to the burner.

Another object of the invention is to provide means in a system of this character for supplying air in predetermined variable quantity to the burning fuel at the burner.

A further object of the invention relates to the provision of a source of heated fluid or air for admixture with the combustible material as it is being pulverized, to the pulverized material laden air stream drawn from the pulverizing means for delivery to a burner or burners, and to the burning fuel at the burner.

It may be desirable under certain conditions to mix air at the temperature of the prevailing surrounding atmosphere with the combustible material as it is rendered pulverulent, or with the pulverized material as it is drawn off from the pulverizing means to be transported to a furnace for combustion, or with the burning fuel at the burner, whereas, under other conditions, due to the low temperature and to moisture in the atmosphere, it may be found desirable to utilize a heated and dry air for admixture with the material either during the pulverizing of the material, as it is drawn from the pulverizing means, or at the place of combustion, and it is a further object of the invention to provide regulatable means to variably connect or shut off the system from either one or both the heated air supply and the atmosphere.

It is a further object of the invention to provide pulverizing means in a system of this character wherein the material as it is being pulverized is agitated and to draw air through the material as it is being agitated for admixture with the pulverulent material.

Another object relates to the provision of regulatable means for feeding material to the pulverizing means proportional to the material drawn therefrom.

Other objects and advantages will hereinafter appear.

In the drawings accompanying and forming a part of this specification Figure 1 is an elevational view, partly in section, of an installation for carrying out my improved system and process of and means for preparing fuel and delivery thereof to a place of combustion.

Figure 2 is a longitudinal sectional view of pulverizing means, forming a part of the system, and showing the means for controlling the supply of air thereto, and also the means to control the drawing of air with material from the pulverizing means.

Figure 3 is a sectional view taken on the line 3—3 of Figure 1 looking in the direction of the arrows.

Figure 4 is a sectional view taken on the line 4—4 of Figure 2 looking in the direction of the arrows.

Figure 5 is a perspective view showing a burner in relation to the means for delivering material from the pulverizing means.

Figure 6 is an elevational view on an enlarged scale looking at the lefthand end of Figure 1 to show the relation of the material feeding means to the pulverizing means, the connection of the pulverizing means to a source of preheated air supply.

Figure 7 is an elevational view, partly in section, looking at the front of the means for mounting a burner or burners connected to the fuel preparing and conveying means in relation to an opening leading to a furnace, and of means to variably supply air to the burning fuel at the burner.

Figure 8 is a sectional side elevation taken substantially on the line 8—8 of Figure 7 looking in the direction of the arrows.

Figure 9 is a perspective view of the adjustable means for regulating the supply of air to the burner.

Figure 10 is an elevational detail view showing the connection of a pair of burners to the delivery of the pneumatic means or feed of the fuel and showing means to regulate the flow of fuel to the burners.

Figure 11 is a view similar to Figure 10 but showing the same arranged for delivering fuel to three burners; and Figure 12 is a sectional view taken on the line 12—12 of Figure 11 looking in the direction of the arrows.

In the embodiment of the invention illustrated in the drawings a combustible material is rendered pulverulent in a disintegrating means, comprising a drum or mill including a cylindrical shell 14 having heads 15, 15' at opposite ends, arranged with a hollow trunnion 16, 16' to rotatably mount the same in bearings 17, 17' and rotated by a pinion 18 on the shaft of a motor M meshing with an annular gear 19 fixed to the drum. The cylindrical shell and heads are arranged with liners of wear resisting material, such as manganese steel, as shown at 20.

Trunnion 16 serves as a charging opening while trunnion 16' serves as a delivery opening, the material being disintegrated or rendered pulverulent by freely moving hardened steel balls or the like in the drum through the revolving thereof. The trunnions are of large area to provide a large wearing surface and to reduce the size of the openings through said trunnions reducers 21 are mounted therein having the inner wall arranged to diverge into the drum and provided with a spirally formed rib or screw 22, the inner walls of the cylinder heads being also arranged at an angle to diverge into the drum, whereby any of the material or the grinding elements which may be directed toward the trunnions as the same is cascaded in the drum during the revolving thereof will be directed back into the drum. Crushed combustible material, such as coal, is fed to the mill through the trunnion 16 by feeding means adjustable to feed a predetermined quantity of material to the mill per unit of time, said material feeding means having a substantially air tight connection with the trunnion opening. In the embodiment shown the crushed combustible material is delivered from a bin 23 having a hopper outlet 24 disposed above a rotatable disk 25 and onto which disk the material is delivered, and delivered from said disk by a fixed scraper or blade 26 into a chute 27 extending through a fixed housing 28 mounted on a bracket 29 fixed to the trunnion support 17, said chute extending into the trunnion 16 to deliver the material into the trunnion from which it is delivered by the rib or screw 22 into the drum, the accumulation of the material, as shown at 30, maintaining the outlet of the chute substantially air tight. The scraper or blade 26 is adjustable to deliver variable amounts from the disk into the chute. Means are provided to deaden the sound of the grinding elements striking against the wall of the drum, and shown as comprising an air chamber 31 extending around the cylinder 14 formed by a second cylindrical shell 32.

The pulverized material is drawn off from the drum by pneumatic means and conveyed or delivered to a place of combustion, such as a burner or burners 33 mounted in an opening 34 leading to the fire box or combustion chamber of a furnace (designated in a general way by F), said pneumatic means comprising a fan including a housing 35 and blades 36 rotatable therein, said blades being fixed to and extending radially from a head 37 fixed to a shaft 38 of a motor M' extending axially through the fan housing and of the outlet trunnion of the mill, the fan intake being arranged axially of the housing and connected to the mill by a sleeve 39 fixed to the drum trunnion 16' extending into said fan intake. The outlet of the fan is through the peripheral wall of the fan housing, in the present instance at the top, and the material is delivered or conveyed to the burner through a pipe 40 connected to said outlet and the burner, said pipe being directed upward at an angle and then downward to its connection with the burner.

As stated it is an object of the invention to supply air in variable volume for admixture with the material as it is being pulverized, and to the pulverulent material laden air as it is drawn from the mill, to form a mixture of air and pulverulent material having a uniform density of the pulverulent material for delivery to the burner. For admixing air with the material as it is being pulverized means are provided to supply air to the material feeding end of the mill in variable volume. This air supply may be at a temperature of the prevailing surrounding atmosphere where the mill is located, or it may be from a source of preheated air supply. To admit air at atmospheric temperature an opening 41 to the atmosphere is arranged in the housing 28 connected to the charging trunnion, said opening being provided with a regulatable closure in the form of a plate 42 slidably carried by said housing in relation to the opening 41. The connection of the charging end of the drum with the pre-heated air supply may be from any suitable source, but preferably from a source produced by the heat radiated from the products of combustion and exhausted from the furnace, or which may be radiated from the walls of the furnace. The arrangement shown in Figure 1 comprises a chamber 42′ located above the furnace and having a portion 43 to extend around a flue 44 for the exhaust of the products of combustion with which the furnace has a regulatable connection, as at 45, the portion 43 extending around the flue, being open to the atmosphere at the bottom and closed at the top and having a connection with the chamber 42′, as at 46. The chamber 42′ is connected with the charging end of the drum by a pipe 47 and a pipe 48 connected thereto of reduced size relative to the pipe 47 leading into the housing 28 connected to the charging trunnion, as at 49. The connection of the mill with the pre-heated air chamber may be varied or shut off by suitable valve mechanism, shown in the form of a damper 50 arranged in the pipe 48. By this arrangement of the drum supporting trunnions and the connection of the fan thereto air will be drawn or swept longitudinally through the drum and the material as it is being pulverized therein due to the cascading of the material in the drum induced by the revolving thereof, and by the opening of the charging end of the drum to a greater or less extent to the atmosphere, or pre-heated air supply, pulverulent material of variable degree of fineness mixed with air will be drawn from the mill for delivery for combustion at the burner.

Under certain conditions the quantity of pulverulent material relative to the volume of air in the combustible mixture may be greater than under other conditions, and means are therefore provided for a further air supply for admixture with the pulverulent material mixed with air drawn from the drum and before it is delivered to the burner, which air supply may be at the surrounding atmospheric temperature or pre-heated.

For this purpose there is provided a box 51 at the intake side and extending around the intake opening of the fan housing 35 through which the sleeve 39 projects, which box is in communication with the fan by enlarging the fan intake opening thus providing an annular opening 52 in the fan housing about said sleeve. The opening 53 in the opposite wall of said box through which the sleeve 39 extends is also enlarged to provide an opening to the atmosphere in said box and to the fan housing, the size of which opening is regulatable by closure means consisting of a pair of plates 54 slidably mounted upon the wall of said box to have movement toward and away from the sleeve 39, the plates being arranged with handgrips to facilitate the adjustment thereof, as shown in Figure 4. The preheated air supply to the intake of the fan may be from any suitable source and in the present instance is from the chamber 42′ from which the heated air is supplied to the charging end of the mill. For this purpose a pipe 55 leading from the outlet pipe 47 from chamber 42′ is connected to box 51, as at 56, which connection is regulated by valve mechanism in the form of a pivotally or slidably supported damper plate 57.

Means are also provided to supply a further air supply to the burning fuel at the burner or burners. For this purpose a box like structure 58 is mounted upon the front of the furnace in relation to the opening leading to the combustion chamber in which the burner is mounted, the arrangement in the present instance, as shown in Figure 7, being adapted for a pair of furnaces arranged in juxtaposed relation. This box is arranged with openings 59 to the atmosphere having adjustable closure plates 60 slidably mounted on the wall of the box to variably open said openings to the atmosphere through said openings or shut off said box from the atmosphere. A sleeve 61 is mounted in said box in concentric relation to each of the burners, said sleeves being arranged with circumferentially disposed and equidistantly spaced openings 62. A sleeve 63 (Figure 9) is mounted upon the sleeve 61 to have rotative adjustment about the same which is also arranged with openings 64 equidistantly disposed about the same which are adapted to be placed in register with the openings in sleeve 61 to variably open said openings to the box and through the openings 59 in the box to supply air to the burning fuel at the temperature of the surrounding atmosphere. The adjustable sleeve 63 is provided with a hand grip 65 whereby said sleeve may be readily adjusted through the box openings 59. To furnish a heated air supply to the burning fuel the box 58 is connected to the pre-heated air supply 42′ by a pipe 66 leading from the pipe 47 and connected to the top of the box 58, the connection through said pipe being regulated by valve mechanism in the form of a pivotally or slidably supported damper plate 67. To permit of observing the burning of the fuel, and to also permit of igniting the fuel at the burner, a perforation 68 is arranged in the box 58 within the sleeve 61 adjacent to and preferably below the burner and in line with the opening 34 to the furnace, said opening being normally closed by a pivotally supported plate 69.

The delivery of the fuel to the furnace may be directly from pipe 40. However, in the conveying or transporting of fuel to a pair of furnaces a pair of branch pipes 70, 71 are connected to the pipe 40 by a V coupling 72, the delivery of material through either one or both of said branch pipes controlled by valves, shown in a general way at 73. To convey material to three furnaces a series of three branch pipes 75, 76, 77 are connected to the pipe 40 by a coupling 78, as shown in Figure 11, and the delivery of the material through either one or all of said branch pipes is controlled by valves 73′ similar to the valves 73. To direct a greater volume of the fuel through either one of pipes 70, 71 in a two pipe arrangement a deflector in the form of a plate 79 is fixed to a shaft 80 rotatably mounted in and extending transversely of the coupling 72, said deflector being adapted to be adjusted by a lever 81 fixed to an end of the shaft 80 extending to the exterior of the coupling, the deflector plate being adapted to have movement between a pair of abutment pins 82. When the plate is positioned to engage the pin at the right a greater volume of the fuel will be delivered to the pipe 70 than to the pipe 71, and the reverse will be the case if the plate is adjusted to engage the pin at the left. To regulate the delivery of fuel in variable volume through the pipes 75, 76, 77 in the arrangement shown in Figure 11 a pair of deflector plates 83, 84 are provided mounted on shafts with levers fixed thereto similar to the shaft 80 and lever 81 to adjust the plates relative to pins 85, 86, 87 to regulate the delivery of fuel in variable volume to the respective pipes one relative to the other.

By the upward directing of the delivery pipe 40 from the outlet of the fan and then directing the same downward in a relatively large curve to the connection of the pipe with the branch material distributing pipes leading to the burners the distribution of the solids or particles of combustible material is maintained in equal distribution to the volume of the air, and then equal distribution is maintained in the divided streams through the branch pipes by maintaining the path or flow of the material in a single stream from the fan outlet in a direction in line with the delivery of the material at the burners and dividing said stream laterally into a multiplicity of streams at a point adjacent to where it assumes its downward course, and even though there may result an unequal distribution of the solids through the stream in the bend of the pipe 40 by the splitting of said stream into a multiplicity of streams in this manner there will be an intermixing of the solids with the air as the streams are directed downward, whereby there will be delivered by each of the branch streams a combustible mixture or fuel comprising air and pulverulent material having a uniform density of the pulverized material.

It will be obvious that various modifications may be made in construction and arrangement of parts of the embodiment illustrated for carrying out the invention without departing from the scope thereof.

Having thus described my invention I claim:

1. In a system for the preparation and delivery of coal to a furnace for combustion, a furnace, a burner mounted in an opening to the furnace, pulverizing means including a revoluble drum having means therein operative through the revolving of the drum to pulverize coal, means having a substantially air tight connection with the drum for charging coal to the drum to be pulverized and having an opening to the atmosphere to admit air to the drum, regulatable closure means for said opening for admitting air in variable volume to the drum, a fan rotatable independently of the drum of the pulverizing means having the intake connected with said drum and the outlet with the burner for drawing air into said drum for admixture with the coal as it is pulverized and to draw pulverized coal laden air from the drum and deliver the same to the burner and having an opening to the atmosphere in the connection thereof with the drum for admitting air to the intake of the fan from the exterior of the drum, and regulatable closure means for said opening for supplying air in variable volume to the pulverized coal laden air stream drawn from the drum for mixture and delivery with said stream to the burner.

2. In a system for the preparation and delivery of pulverized coal to a furnace for combustion, a furnace, pulverizing means including a revoluble closed drum for the coal having means therein operative through the revolving of the drum to pulverize the coal, means to charge coal to the drum having an opening to the atmosphere in the connection thereof with the drum, regulatable closure means for said opening to admit air in variable volume to the drum for air sweeping the drum and mixture with the coal as it is pulverized, a burner mounted in an opening to the furnace, suction means connected at the suction side with the drum and at the delivery side with the burner for drawing a pulverized coal laden air stream from the drum and delivery thereof to the burner and having an opening to the atmosphere in the connection thereof with the drum, and regulatable means for said opening for variably connecting the suction means with the atmosphere exterior of the drum and controlling the drawing of an air stream from the drum laden with a predetermined quantity of pulverized coal and supplying additional air in variable volume to the pulverized coal laden air stream drawn from the drum for mixture and delivery with the stream to the burner.

3. A system for the preparation and delivery of pulverized coal to a furnace as claimed in claim 2, wherein the regulatable means for admitting air to the drum and to the suction side of the suction means are adapted to shut off the drum and suction means from the atmosphere, a source of heated air supply, means to connect said heated air supply with the drum and the suction side of the suction means exterior of the drum, and independently operative means for shutting off the connections of the heated air supply from and vary said connections with the drum and suctions means.

4. In a system for the preparation and delivery of pulverized coal to a furnace for combustion, a furnace, a burner mounted in an opening to the furnace, pulverizing means for the coal including a revoluble drum having means therein operative through the revolving of the drum to pulverize the coal in the drum and simultaneously agitate the same, said drum having charging and delivery openings axially at opposite ends and in unobstructed communication with each other through the drum, means having substantially air tight connection with the charging opening of the drum for charging coal to the drum in variable quantities, a fan rotatable independently of the drum and the intake having a substantially air tight connection with the delivery opening of the drum to draw an air stream laden with pulverized coal from the drum, and independently operative regulatable means for admitting a variable air supply to the charging end of the drum and to the intake of the fan for mixture with the coal laden air stream drawn from the drum and delivery therewith by the fan to the burner.

5. In means for preparing and delivering pulverized coal to a burner as claimed in claim 1, regulatable means for supplying additional air in variable volume to the burning coal laden air steam at the burner.

6. In combination with a furnace, a fuel preparing and handling system comprising pulverizing means including a revoluble drum arranged with an unobstructed axial opening therethrough and means therein to pulverize coal in the drum through the revolving of the drum and simultaneously agitate the material, means for feeding coal to the drum having a substantially air tight connection with the opening at one end of the drum, suction means connected to the opening at the opposite end of the drum to draw air into and an air stream laden with pulverized coal from the drum, a burner at the furnace connected to the delivery of said suction means, and regulatable means to control the drawing of air to the drum and the drawing of an air stream from the drum laden with a variable density of pulverized coal.

7. In a system for preparing and handling fuel as claimed in claim 6, means for mounting the burner in substantially air tight connection with an opening leading to the furnace having an opening to the atmosphere arranged with regulatable closure means for admitting additional air in variable volume to the burning fuel at the burner.

8. In combination with a furnace, a fuel preparing and handling system comprising pulverizing means including a revoluble drum having means therein operative through the revolving of the drum to pulverize coal in the drum, a fan having the intake connected axially to one end of the drum for drawing air into and a pulverized coal laden air stream from the drum, means having a substantially air tight connection with the opposite end of the drum for feeding coal in regulated quantity to the drum, a burner mounted in an opening to the furnace, a conduit leading from the delivery side of the fan to the burner through which to transport the pulverized coal laden air stream from the fan to the burner, and a source of heated air supply having a regulatable connection with the feeding end of the drum for supplying heated air in variable volume to the drum for mixture with the pulverized coal to constitute the fuel.

9. In a system for preparing and handling fuel as claimed in claim 8, a regulatable connection between the heated air supply and the connection of the fan with the drum for supplying heated air in variable volume to the intake of the fan for mixture and delivery with the pulverized coal laden air stream drawn from the drum.

10. In a system for preparing and handling fuel as claimed in claim 8, a regulatable connection between the heated air supply and the connection of the fan with the drum for supplying heated air in variable volume for mixture and delivery with the pulverized coal laden air stream drawn from the drum, and a regulatable connection between said heated air supply and the burner for supplying heated air in predetermined variable volume to the burning fuel at the burner.

11. In a system for preparing and handling fuel as claimed in claim 8, a regulatable connection between the heated air supply and the connection of the fan with the drum for supplying heated air in variable volume for mixture and delivery with the pulverized coal laden air stream drawn from the drum, and a connection between said heated air supply and the burner for supplying heated air in predetermined variable volume to the burning fuel at the burner, comprising a box-like structure in which the mounting of the burner is arranged and having openings to said box, a regulatable closure for said openings, and a regulatable connection between said box and source of heated air supply.

12. In means for preparing and handling coal as a fuel, a furnace, pulverizing means including a revoluble drum having an unobstructed passage axially therethrough, freely moving means in the drum operative during the revolving of the drum to pulverize coal in the drum, means for feeding coal to one end of the drum, a burner mounted in an opening to the furnace, pneumatic means connected to the end of the drum opposite to the feeding means for drawing a pulverized coal laden air stream from the drum and delivering the same to the burner, a heated air supply having connections with the drum, the pneumatic means and the burner at the furnace, and regulatable means in said connections for supplying heated air through the action of the pneumatic means to the drum, the pulverized coal laden air stream drawn from the drum, and to the burning fuel at the furnace.

13. In means for the preparing and handling of coal as a fuel, a furnace, pulverizing means operative to pulverize coal, suction means to draw an air stream laden with pulverized coal from the pulverizing means, a burner mounted in an opening to the furnace connected with the delivery side of the suction means, means for feeding coal to the pulverizing means proportional to the withdrawal of pulverized coal therefrom by the suction means, regulatable means for supplying air at atmospheric temperature in variable volume to the pulverizing means for mixture with the coal as it is pulverized, regulatable means in the connection of the suction means with the pulverizing means for supplying additional air at atmospheric temperature for mixture with the pulverized coal laden air stream drawn from the pulverizing means, regulatable means at the burner mounting in the furnace for supplying additional air at atmospheric temperature to the burning fuel at the burner, a heated air supply, and regulatable connections between the heated air supply with the pulverizing means for mixture with the coal as it is pulverized, the suction means for mixture with the pulverized coal laden air stream drawn from the pulverizing means, and with the burner mounting for supplying an additional heated air supply to the burning fuel at the burner.

Signed at the city of New York, in the county of New York and State of New York this 16th day of January, 1926.

JOSEPH E. KENNEDY.